United States Patent [19]

Adams

[11] 4,276,852
[45] Jul. 7, 1981

[54] PAINTING AND MISTING SHIELD

[76] Inventor: Daisy E. Adams, 1415 E. Bethany Home Rd., #18, Phoenix, Ariz. 85014

[21] Appl. No.: 63,540

[22] Filed: Aug. 3, 1979

[51] Int. Cl.³ ............................................. B05C 15/00
[52] U.S. Cl. .................................... 118/326; 118/301; 118/504
[58] Field of Search ............... 118/501, 504, 505, 506, 118/301, 326; 15/296, 248 R

[56] References Cited
U.S. PATENT DOCUMENTS 2,332,579  10/1943  Kirby .................................. 118/505
2,874,676  2/1959  Fournier ........................ 118/504 X
2,954,752  10/1960  Hawward ............................ 118/505

Primary Examiner—John P. McIntosh
Attorney, Agent, or Firm—Harry M. Weiss

[57] ABSTRACT

This is an improved type of painting or misting shield which contains an upright, preferably concave curved member (which is made of hard-baked enamel when the shield is used as a painting shield) to serve as a backstop or shield while either misting plants with a water mist spray or spraypainting with a paint spray. The shield also comprises a trough located at the bottom thereof to serve as a means for trapping the unused water or paint that has been stopped by the shield.

3 Claims, 4 Drawing Figures

PAINTING AND MISTING SHIELD

BACKGROUND OF THE INVENTION

1. Field of the Invention

This invention relates generally to shields and, more particularly, to shields for water or paint spraying type applications.

2. Description of the Prior Art

In the past, when a plant required misting, or an object required spraypainting, the object in question would have to be either moved, so that nothing near it would be hit by the unused portion of the spraying liquid, or it would be necessary to use some sort of dropcloth to prevent the areas in the vicinity of the object being sprayed from being undesirably hit with the excess spraying liquid. Yet, either solution (moving the object or covering the other areas) resulted in a waste of the spraying liquid being used, plus possibly the need to move the object to be sprayed.

A need existed to provide a shield that could both catch the unused sprayed liquid for possible reuse and also stop the sprayed unused liquid from damaging other objects or surfaces in the immediate vicinity of the object being sprayed, without necessitating removal of any of the objects near it, or the object to be sprayed.

SUMMARY OF THE INVENTION

In accordance with one embodiment of this invention, it is an object of this invention to provide an improved type of painting or misting shield.

It is another object of this invention to provide an improved type of painting or water mist shield that is useful for catching sprayed and unused liquids when water misting or paint spraying thereby preventing these liquids from coming in contact with other surfaces or objects and for trapping and gathering this unused liquid spray for possible future use.

It is another object of this invention to provide an improved type of painting or misting shield that permits both the catching and trapping of sprayed excess liquids.

It is still another object of this invention to provide a painting or misting shield having means for facilitating pouring of the unused sprayed liquid captured by the shield into another container or object.

DESCRIPTION OF THE SPECIFICATION

Figure 1:
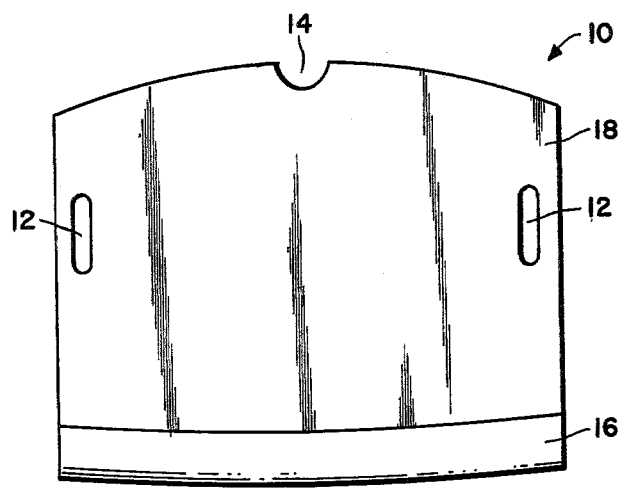
FIG. 1 is a front elevational view of a shield comprising an upright, preferably concave curved member which has hand grips and a sprout and a collection trough at the bottom of said shield.

Referring to FIG. 1, a shield useful for catching excess sprayed liquid and trapping it when water misting (such as for water spraying house plants) or spraypainting, is generally designated by reference number 10. The shield 10, in this embodiment, is shown as preferably containing two handles or grips 12, a spout 14, a trough 16 and a main shield portion comprising a preferably concave curved upright member 18. The shield 10 is preferably made of light weight plastic for water misting or spraying applications. However, for paint spraying applications, the shield 10 is preferably made of a material that paint cannot wet or coat such as a hard-baked enamel. The handles or grips 12 serve to facilitate holding and handling of the shield 10. The spout 14 at the upper portion of the concave curved upright member 18 serves to facilitate pouring into another container (not shown) of the captured, sprayed and unused liquid once it has been collected in trough 16.

Figure 2:
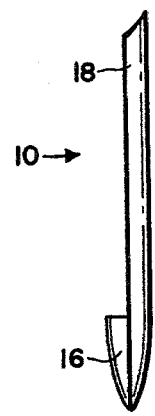
FIG. 2 is a side elevational view of the shield of FIG. 1.

Referring to FIG. 2, a side view of the shield 10 of FIG. 1 is shown. FIG. 2 shows the concave arc of the upright member 18 of the shield 10 and the concavity of the trough 16 to provide for optimum efficiency in catching and storing the captured, sprayed and unused liquid. The concave shape of the member 18 also allows the captured liquid to be poured out through the spout 14 into another container (not shown).

Figure 3:
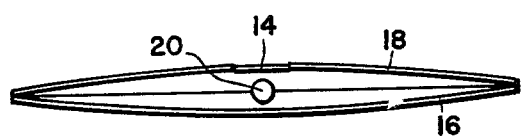
FIG. 3 is a top view of a shield similar to FIG. 1 showing another trough embodiment.

Referring to FIG. 3, a top view of another embodiment of the shield 10 of FIG. 2 is shown. FIG. 3 shows again the curvature of the shield and trough, preferably approximately 140°, to provide for optimum trapping, collection and pouring and in addition shows a stopper or cork 20 centrally located at the bottom of the trough 16 which can be removed for drainage as an alternative means of removing the trapped liquid rather than using the spout 14 which requires tipping the shield 10. In this embodiment, it is important to have the center portion of the trough 16 at the lowest point which can be achieved by slanting the bottom wall portions of the trough 16 as shown in FIG. 4.

Figure 4:
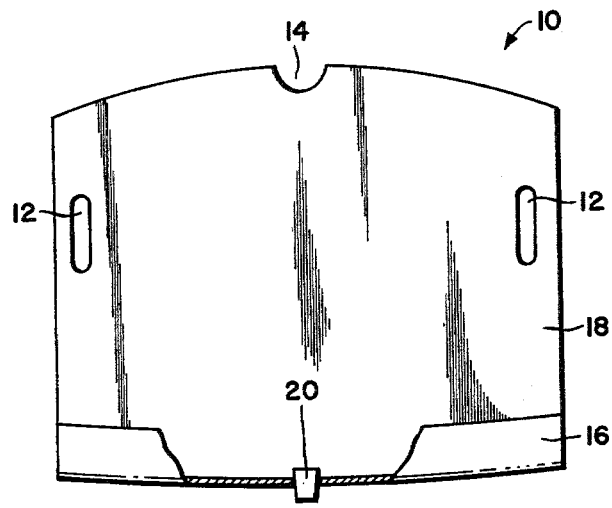
FIG. 4 is a front elevational view similar to FIG. 1 with parts broken away to show the embodiment of FIG. 3.

Thus, FIG. 4 shows the curvature of the bottom walls of the trough 16 to allow the captured liquid to flow out of the center portion of the trough 16 for drainage through the opening covered by the stopper or cork 20 which is removed for this type of drainage operation.

While the invention has been particularly described and shown in reference to the preferred embodiments thereof it will be understood by those skilled in the art that various changes in form and detail and omissions may be made therein without departing from the spirit and scope of the invention.

What is claimed:

1. A freely portable shield for capturing a sprayed liquid, comprising:
   a portable upright spray catching member;
   trough means connected to the bottom of said spray catching member for holding sprayed unused liquid; and
   said upright spray catching member having a continuous uninterrupted concave curved surface located above said trough means.

2. A shield in accord with claim 1 further comprising:
   spout means for permitting pouring out of the unused liquid located in said trough means; and
   said spout means being located at the top of said member.

3. A shield in accord with claim 1, further comprising:
   drain means located at the bottom of said trough means for permitting drainage of the unused liquid located in said trough means;
   said drain means comprising said trough means having an opening at a lowest point and further having walls sloping down to said opening;
   said member comprising one of said walls; and
   said drain means further comprising stopper means for permitting selective sealing of said opening.

* * * * *